H. J. CARRIGAN.
LEVEL.
APPLICATION FILED NOV. 14, 1908.
975,830.
Patented Nov. 15, 1910.
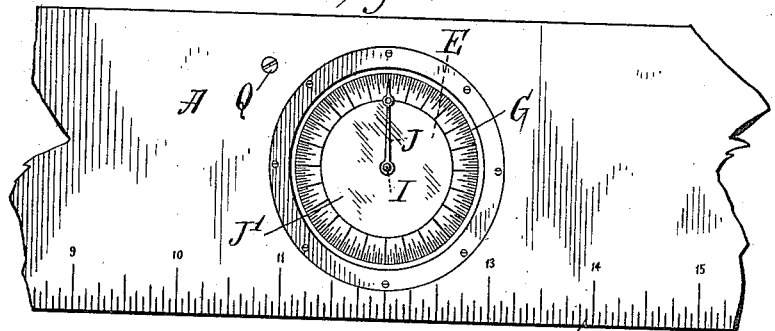
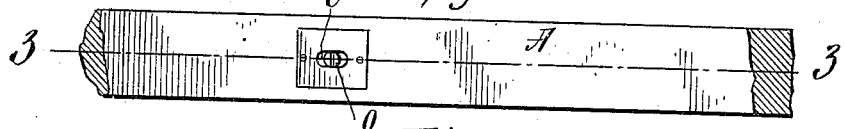
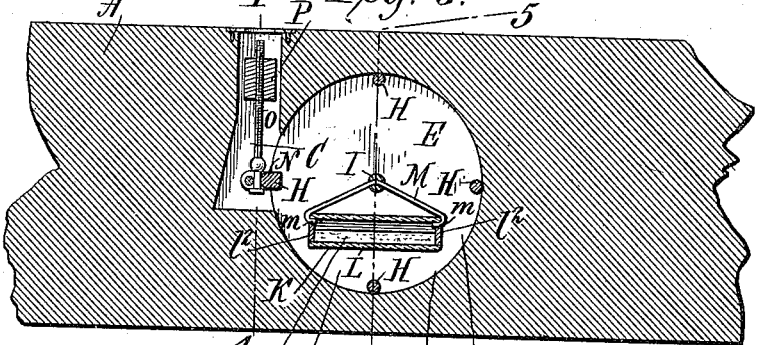
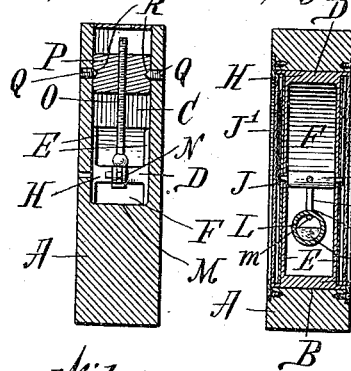
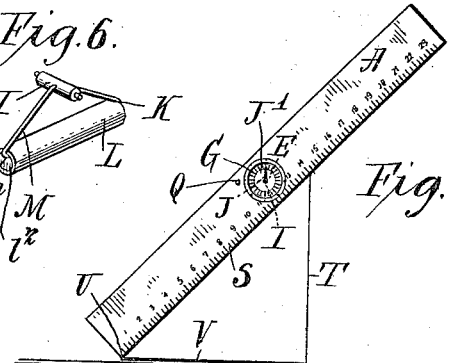
Witnesses:
Christ Finke, Jr.
Ella C. Blueckhahn.
Henry J. Carrigan, Inventor.
By Emil Neuhart
Attorney.

UNITED STATES PATENT OFFICE.

HENRY J. CARRIGAN, OF BUFFALO, NEW YORK.

LEVEL.

975,830.

Specification of Letters Patent. Patented Nov. 15, 1910.

Application filed November 14, 1908. Serial No. 462,686.

*To all whom it may concern:*

Be it known that I, HENRY J. CARRIGAN, a citizen of the United States, and resident of Buffalo, in the county of Erie and State of New York, have invented certain new and useful Improvements in Levels, of which the following is a specification.

My invention is an improvement in levels and the like, and has particular reference to a gravity level; and its object is to provide a simple, perfectly true and correct level combining the advantages of an ordinary spirit-level and a gravity level.

Another object is, to provide the level with a graduated indicating-annulus or dial so that the exact degree in which the level is held may be ascertained; and to provide one longitudinal marginal portion of the stock or body of the level with graduations, denoting by preference, inches and fractions thereof so that the length of rafters, stair-stringers and the like may be determined when arranged to any known angle; and so that the height of an object may be measured from a distant point.

The ordinary spirit-level is quick-acting and accurate but requires close and careful examination to center the air-bubble in the tube and determine a line or plane parallel with the horizon; whereas a gravity level, such as now in use, while easy to read, is slow in action and unsteady, and requires time to bring it into a state of equipoise. To overcome the disadvantages of both these forms of levels, I have designed what may well be termed a "liquid-gravity" level; and my invention consists in a level having an indicating-mark or marks, and a weighted oscillating-index in which the weight is hollow and nearly filled with a liquid, such as alcohol, mercury, or the like; the liquid acting to quickly bring the oscillating weight into a state of equipoise and to make said weight quicker in action and very sensitive.

The invention also consists in the construction, arrangement and combination of parts to be hereinafter described and particularly pointed out in the appended claims.

In the drawings,—Figure 1 is a side elevation of a portion of a level equipped with my invention. Fig. 2 is an upper edge view of the same. Fig. 3 is a central longitudinal section taken on line 3—3, Fig. 2. Fig. 4 is a cross-section taken on line 4—4, Fig. 3. Fig. 5 is a cross-section taken on line 5—5, Fig. 3. Fig. 6 is a detached perspective view of the liquid-weight and its supporting pintle. Fig. 7 is a side elevation of the complete level on a reduced scale, the same being set at an angle of 45 degrees.

Referring now to the drawings in detail, like letters of reference refer to like parts in the several figures.

The reference letter A designates the stock or body-portion of the level provided at a point midlength and centrally between its edges with a circular opening B and to one side of said opening with a recess or pocket C extending vertically to the upper edge of the stock.

Within said circular opening an indicator-frame D is secured, said frame comprising two dial-plates E separated by an intervening space F and having their marginal portions graduated, as at G, or having their faces covered with graduated dial-pieces, as may be desired. The graduations are arranged in circular series and divided into degrees. The dial-plates are connected by means of cross-members H, and mounted to rock in said plates is a pintle I having its ends reduced and passed through said plates; and to the projecting reduced ends of said pintle, index-fingers J are secured. In order to protect the dial-plates and index-fingers, I cover the same with glass, as at $J^1$.

K designates a gravity element in the form of a pendulum or oscillating weight; and it comprises a tube L, preferably of glass, and a hanger M formed of wire passed through said pintle and directed toward opposite ends of said tube, which hangs beneath and at a right-angle to said pintle; the ends of said wire being bent into the ends of said tube, as at $m$. Within the latter, a quantity of mercury, alcohol or other suitable fluid $l$ is placed, the ends of the tubes being sealed or otherwise closed, as at $l^2$, to retain the fluid in the tube and also to prevent disengagement of the tube from the hanger.

Extending into the pocket C of the stock from the frame D is a bifurcated lug N to which the inner end of an adjusting-screw O is rotatably connected; said screw being threaded through a block P arranged transversely in the pocket C and held so that it may rotate slightly to accommodate itself to the changing angle of the adjusting-screw as the dial-frame is adjusted. The latter is free to rotate without rotating the pintle I, thus permitting the gravity-element to retain its state of equipoise while the dial-frame is moved to bring the zero marks or graduations thereon in registration with the index-fingers. The means herein shown for retaining the block P in position, yet allowing it to rotate, comprises two conical ended screws Q threaded through the sides of the stock and having their conical ends entering complementary depressions R in the ends of said blocks, as clearly shown in Fig. 4.

The lower marginal portion of the stock is graduated, as at S, the graduations denoting inches and fractions thereof; and by means of these graduations and the indicator-dials E, the length to which rafters, stair-stringers or the like must be cut when set at a certain angle, can be easily ascertained. For example, in Fig. 7, the stock is arranged at an angle of forty-five degrees, the line T designates the center of a building and the point U the side of the building. Now assuming each inch to represent one foot, it is clearly apparent that the rafter of a building twice the width of the distance designated by the line V, when arranged at an angle of forty-five degrees will be fourteen feet long.

It is obvious that the principle of this invention may be applied in a number of different ways, and I therefore do not restrict myself to the construction shown, which is only one representative form; but Having illustrated and described what is now considered the preferred form, what I claim is,—

1. A level comprising a stock provided with an opening, an indicator-frame set into said opening and having graduated faces exposed on opposite sides of said stock, a pintle mounted in said frame, index-fingers secured to opposite ends of said pintle, a hanger formed of wire passed through said pintle, and inclined in opposite directions with its extremities recurved to form opposite hooks, a tube hung upon said hooks and sealed at the ends to prevent disengagement of said hooks from said tube, said tube containing a fluid retained by sealing the ends of said tube.

2. A level comprising a stock provided with a transverse opening and a pocket extending inward from one edge of said stock and in connection with said opening, an indicator-frame rotatable within said opening and having a graduated face, an adjusting-screw in said pocket connected at its inner end to said indicator-frame, an index-finger coöperating with the graduations on the face of said frame, and an oscillating-member within said frame controlling the movements of said index-finger.

3. A level comprising a stock provided with a transverse opening and a pocket extending inward from one edge of said stock and in connection with said opening, an indicator-frame rotatable within said opening and having a graduated face, a rotatable block in said pocket, an adjusting-screw threaded through said block at a right-angle to its axis and connected at its inner end to said indicator-frame, an index-finger coöperating with said indicator-frame, and an oscillating-member within said frame controlling the movements of said index-finger.

In testimony whereof, I have affixed my signature in the presence of two subscribing witnesses.

HENRY J. CARRIGAN.

Witnesses:
ELLA C. PLUECKHAHN,
EMIL NEUHART.